United States Patent [19]
Förster

[11] Patent Number: 6,044,939
[45] Date of Patent: Apr. 4, 2000

[54] VIBRATION DAMPER, FOR A MOTOR VEHICLE, WITH ADJUSTABLE DAMPING FORCE

[75] Inventor: Andreas Förster, Schweinfurt, Germany

[73] Assignee: Fichtel & Sachs, Schweinfurt, Germany

[21] Appl. No.: 08/878,721

[22] Filed: Jun. 19, 1997

[30] Foreign Application Priority Data

Jun. 21, 1996 [DE] Germany .......................... 196 24 895

[51] Int. Cl.[7] ................................................... F16F 9/46
[52] U.S. Cl. ................................... 188/266.6; 188/299.1
[58] Field of Search ........................... 188/266.1–266.7, 188/299.1; 137/487.5; 251/129.01

[56] References Cited

U.S. PATENT DOCUMENTS

| | | | |
|---|---|---|---|
| 5,398,787 | 3/1995 | Woessner et al. | 188/266.6 |
| 5,439,085 | 8/1995 | Woessner | 188/266.6 |
| 5,449,055 | 9/1995 | Geiling et al. | 188/266.6 |
| 5,503,258 | 4/1996 | Clarke et al. | 188/282 |
| 5,651,433 | 7/1997 | Wirth et al. | 188/299 |
| 5,833,037 | 11/1998 | Preukschat | 188/299.1 |

FOREIGN PATENT DOCUMENTS

| | | |
|---|---|---|
| 0399326 | 11/1990 | European Pat. Off. . |
| 4114305 | 6/1992 | Germany . |
| 4104110 | 8/1992 | Germany . |
| 4424436 | 1/1996 | Germany . |

*Primary Examiner*—Chris Schwartz
*Attorney, Agent, or Firm*—Nils H. Ljungman & Associates

[57] ABSTRACT

The cylinder is filled with damping medium. The vibration damper also includes a damping valve which is active as a function of pressure. The damping force of the damping valve can be modified by means of an actuator against a spring force on a shutoff valve body. An admission valve with its own damping action is connected hydraulically in series with the damping valve, so that the action of the admission valve is superimposed on the action of the adjustable damping valve.

20 Claims, 7 Drawing Sheets

FIG.7

VIBRATION DAMPER, FOR A MOTOR VEHICLE, WITH ADJUSTABLE DAMPING FORCE

BACKGROUND OF THE INVENTION

1. Field of the Invention

The present invention relates generally to a vibration damper with adjustable damping force. The vibration damper includes a cylinder filled with damping medium. In the cylinder, a piston rod with a piston is realized so that the piston rod can move axially and the piston can divide the cylinder into two working chambers. The damping valve can operate as a function of pressure. The damping force of the damping valve can be modified by means of an actuator against a spring force on a shutoff valve body.

2. Background Information

German Patent No. 41 14 305 A1 discloses a known vibration damper similar to that described above. The damping force characteristic of the vibration damper depends essentially on the tuning or adjustment of a spring which spring acts on a shutoff valve body. The sizes of the respective pressurized surfaces also have a very significant influence on the opening behavior of the damping valve.

Relatively flat damping force characteristics are altogether typical of a valve of this construction, and these damping force characteristics run essentially parallel to one another in the range of relatively high flow velocities of the damping medium. In this context, reference is made to German Patent No. 41 04 110 A1, FIG. 13. The very simple response to the requirement for greater damping forces at higher volume flows is to set an overall harder damping force characteristic. Such a design naturally requires a relatively high switching frequency of the damping valve. Depending on the direction of action of the actuator, there can also be an increased consumption of energy, namely when the actuator sets a higher damping force characteristic with a greater energy supply.

OBJECT OF THE INVENTION

The object of the present invention is to find a simple and economic solution to the problem described above, namely a solution which keeps the effort and expense required to regulate the actuation of the variable damping force valve on a reasonable level.

SUMMARY OF THE INVENTION

The present invention teaches that this object can be accomplished in accordance with at least one possible embodiment, by an arrangement in which an admission valve with its own damping action can be connected hydraulically in series with the damping valve. The action of the admission valve can then be superimposed on the action of the adjustable damping valve.

Advantageously and without having to make modifications to the adjustable damping valve itself, the damping force generated by the vibration damper can be very simply adjusted to the desired damping force characteristics by means of the admission valve. It can be apparent from the design of the hydraulic series connection how the overall damping force characteristic will look. Likewise, the damping force characteristic can also be shifted in the "hard" direction, without having to always set a harder damping by means of the actuator. Consequently, the present invention makes possible the maintaining of reserves of damping force for extreme situations in a manner which was heretofore impossible.

The present invention teaches that it is also possible to correct only specified portions of the damping force characteristic by means of the admission valve. For example, the adjustable damping valve has a pilot cross section on which is superimposed a pilot cross section of the admission valve. The adjustable damping valve is actuated by a pilot valve. The damping valve is in communication by means of an opening with a control chamber. Whereby, by means of the pressure in the control chamber, a closing force is exercised on the shutoff valve body. The pressure in the control chamber is a function of the size of a throttle cross section. The size of the throttle cross section can be adjusted by means of an actuator. The throttle cross section of the pilot valve for the damping valve influences the pilot cross section. Of course, it is also possible to imagine a damping valve with an adjustable damping force which does not have a pilot valve. In this context, reference is made to European Patent No. 0 399 326 B1. For example, the admission valve can have an admission cross section which is at least partly covered by at least one valve disc. Depending on the deformation of the valve disc or another type of spring load, or the size of the pressurized surface, the opening and thus the damping behavior can be set in particular to a medium volume flow or a medium stroke velocity of the piston rod.

So that the dynamic pressure or impact pressure from the admission valve via the main stage valve is not linear, and is thus active to its full extent in the direction of the pilot valve, the opening to the control chamber of the damping valve is at some radial distance from the admission cross section of the admission valve.

For reasons of fabrication and to utilize the installation space more efficiently, the valve disc of the admission valve is concentric to the adjustable damping valve, whereby each valve has a separate valve seat surface. One problem is that it is difficult to manufacture rather large valve seat surfaces with an appropriate accuracy regarding geometric and dimensional tolerances. The separated valve surfaces are small in their radial dimension, which solves the problem described above.

To raise or increase the damping force characteristic at very high flow velocities, the admission valve is provided with a pre-throttle or pilot throttle. It is precisely this pre-throttle which makes possible a controlled increase of the damping force without any reduction in comfort.

The present invention also teaches that the admission valve has a plurality of admission cross sections which are separated by webs. The valve disc thereby receives a uniform incoming flow over its entire periphery. In this context, it has been found very advantageous that the webs, toward the middle of the admission valve, form an opening in which there are fastening means for the at least one valve disc.

In accordance with at least one possible embodiment of the present invention, the main stage valve can be an electromagnetic valve. The main stage valve can be mass-produced for use in a variety of different motor vehicles. The main stage valve should preferably have several different flow characteristics. The flow characteristics should correspond to different damping force characteristics over a range of flow of damping fluid through the main stage valve.

In accordance with another possible embodiment, the main stage valve could be used to supply the flow characteristic of the shutoff valve device. However, the flow characteristics of the main stage valve may not meet the desired flow characteristics of the shutoff valve device for some types of motor vehicles. In addition, a very large supply of energy may be required for the main stage valve to provide the desired flow characteristics of the shutoff valve device. To obtain the desired flow characteristic of the shutoff valve device or to reduce the energy supply required by the main stage valve, an admission valve can be connected in series with the main stage valve. By connecting an admission valve in series with the main stage valve, the flow characteristic of the admission valve can be combined with the flow characteristics of the main stage valve to produce the desired flow characteristic of the shutoff valve device. The flow characteristic supplied by the admission valve can be used to reach a desired flow characteristic for the shutoff valve device or to reduce the energy supply required by the main stage valve to produce the desired flow characteristic of the shutoff valve device.

In accordance with yet another possible embodiment, different types of motor vehicles can require different flow characteristics from the shutoff valve device for optimal performance of the motor vehicle. Instead of manufacturing a different main stage valve with different flow characteristics for each different type of motor vehicle, the main stage valve can be mass produced and combined with an appropriate admission valve. Combining a mass-produced main stage valve with an admission valve can be a cheaper and simpler way to obtain the desired flow characteristics of the shutoff valve device. The admission valve can have a relatively simple design when compared to the main stage valve. Further, the admission valve can be manufactured more economically and efficiently than the more complicated main stage valve. There can be a variety of different styles of admission valves, wherein each of the different admission valves can have a different flow characteristic. The admission valve can be selected to produce a desired flow characteristic of the shutoff valve device when combined with a mass-produced main stage valve to enable tailoring of the flow characteristic of the shutoff valve device to a particular motor vehicle.

In accordance with still another possible embodiment, the combination of a mass-produced main stage valve with a selected admission valve can be a simple way to tailor the flow characteristic of the shutoff valve device to a particular motor vehicle. The tailoring of the flow characteristic of the shutoff valve device to a motor vehicle may be advantageous for low production runs of motor vehicles. It may be cheaper and easier to tailor the flow characteristic of the shutoff valve device to a particular run of a motor vehicle by combining a different admission valve with a mass-produced main stage valve then to produce different main stage valves for each different production run. Further, the flow characteristic of the shutoff valve device can be tailored to compensate for different options and styles of a motor vehicle. For example, a four door model may require different flow characteristics from the shutoff valve device than a two door model. Finally, the flow characteristic of the shutoff valve device can be tailored to compensate for the varying weight and weight distribution of a motor vehicle. Since the weight and weight distribution of a motor vehicle is not uniform, the vibration dampers should have different damping characteristics to compensate for these variations. For example, the flow characteristics of shutoff valve devices for vibration dampers near the front of a motor vehicle should be different from the flow characteristic of the shutoff valve devices located at the rear of the motor vehicle.

In one possible embodiment of the present invention, the admission valve can attached to the main stage valve very easily. The easy attachment of the admission valve can permit a change of the flow characteristics of the shutoff valve device after initial assembly of the vibration damper. To change the flow characteristic, the shutoff valve device should be removed and the old admission valve be replaced with a new admission valve having a different flow characteristic. The easy change of admission valves can prolong the use of the shutoff valve device by making the shutoff valve device applicable to many different situations. Finally, the ability to change admission valves can provide the desired flow characteristic of the shutoff valve device even after the flow characteristics of the main stage valve have deteriorated.

The above discussed embodiments of the present invention will be described further hereinbelow with reference to the accompanying figures.

BRIEF DESCRIPTION OF THE DRAWINGS

The present invention is explained in greater detail below with reference to the embodiments illustrated in the accompanying drawings, wherein.

DESCRIPTION OF THE PREFERRED EMBODIMENT

Figure 1:
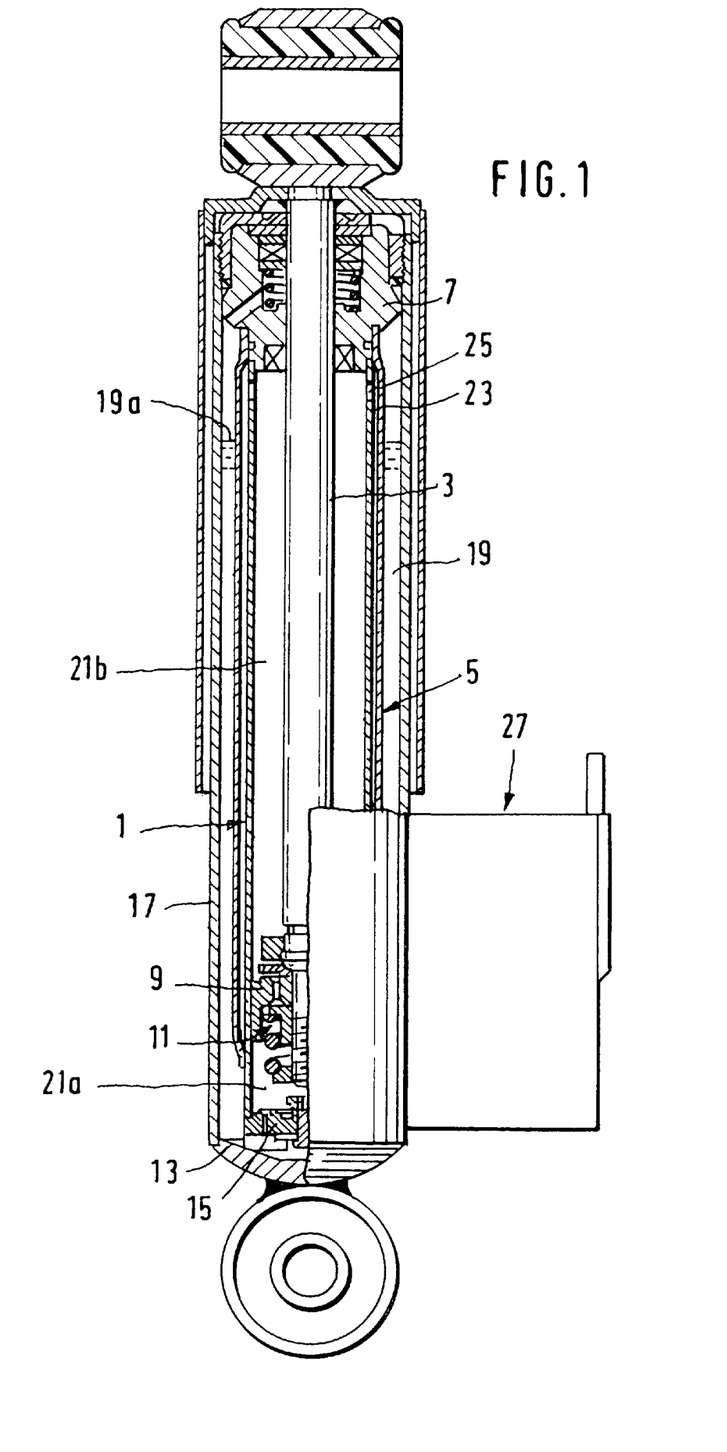
FIG. 1 is an overall view of a vibration damper.

In FIG. 1, a vibration damper has a cylinder 1 in which a piston rod 3 can be located so that the piston rod 3 can move axially. A guidance and sealing unit 7 can guide the piston rod 3 as it moves out of an upper end of the cylinder 1. Inside the cylinder 1, a piston unit 9 with a piston valve system 11 can be fastened to the piston rod 3. A lower end of the cylinder 1 can be closed by means of a bottom or base plate 13. The bottom or base plate 13 can have a bottom valve system 15. The cylinder 1 can be surrounded by a reservoir tube or outer tube 17. The reservoir tube 17 and an intermediate tube 5 can form a ring-shaped chamber 19. The ring-shaped chamber 19 can represent an equalizing chamber. The space inside the cylinder 1 can be divided by the piston unit 9 into a first working chamber 21a and a second working chamber 21b. The working chambers 21a and 21b are preferably filled with hydraulic fluid. The ring-shaped chamber or equalizing chamber 19 can be filled up to the level 19a with fluid and above that with gas. Inside the equalizing chamber 19 there can be a first line segment, namely a high pressure segment 23. The high pressure segment 23 can be in communication via a boring 25 of the cylinder 1 with the second working chamber 21b. Connected to the high pressure segment 23 can be a shutoff valve device 27. The shutoff valve device 27 can be attached laterally to the reservoir tube 17. From the shutoff valve device 27, a second line segment (not shown), namely a low pressure line segment, leads into the equalizing chamber 19.

In other words and in accordance with another possible embodiment, the high pressure segment, high pressure line or high pressure connection 23 can be located between the cylinder 1 and the intermediate tube 5. A boring, hole or passage 25 in the cylinder 1 can provide a passageway for damping fluid to flow between the second or upper working chamber 21b and the high pressure line 23. The high pressure line 23 is preferably then connected to a shutoff valve device 27. The low pressure segment, low pressure line or low pressure connection can connect the shutoff valve device 27 to the equalizing chamber 19.

As the piston rod 3 is moved upward and out of the cylinder 1, the upper working chamber 21b can become smaller. An overpressure builds up in the upper working chamber 21b, which overpressure can be dissipated by the piston valve system 11 into the lower working chamber 21a, only as long as the shutoff valve 27 is closed. When the shutoff valve device 27 is opened, fluid can also flow from the upper working chamber 21b through the high-pressure line segment 23 and the shutoff valve device 27 into the equalizing chamber 19. The damping characteristic of the vibration damper as the piston rod 3 is extended therefore can depend on the extent to which the shutoff valve device 27 is open or closed. The shutoff valve device 27 can thereby be adjusted either in discrete stages or continuously.

As the piston rod 3 is inserted into the cylinder 1, an overpressure can be formed in the first or lower working chamber 21a. Fluid can flow from the lower working chamber 21a through the piston valve system 11 upward into the upper working chamber 21b. The fluid displaced by the increasing piston rod volume inside the cylinder 1 can be expelled through the bottom valve system 15 into the equalizing chamber 19. An increasing pressure can also occur in the upper working chamber 21b, because the flow resistance of the piston valve system 11 is lower than the flow resistance of the bottom valve system 15. If the shutoff valve system 27 is open, this increasing pressure can overflow through the high pressure segment 23 into the equalizing chamber 19. In other words, when the shutoff valve device 27 is open, the shock absorber can have a softer characteristic even when the piston rod 3 is being inserted, and a harder characteristic when the shutoff valve device 27 is closed, and likewise, when the piston rod 3 is extended. It should be noted that the direction of flow through the high pressure segment 23 of the bypass is preferably always the same, regardless of whether the piston rod 3 is moving into or out of the cylinder 1.

In another possible embodiment of the present invention, the shock absorber can have a softer characteristic when the shutoff valve device 27 is open and a harder characteristic when the shutoff valve device 27 is closed. The shock absorber can have the above characteristics regardless of whether the piston rod 3 is being inserted or extended.

Figure 2:
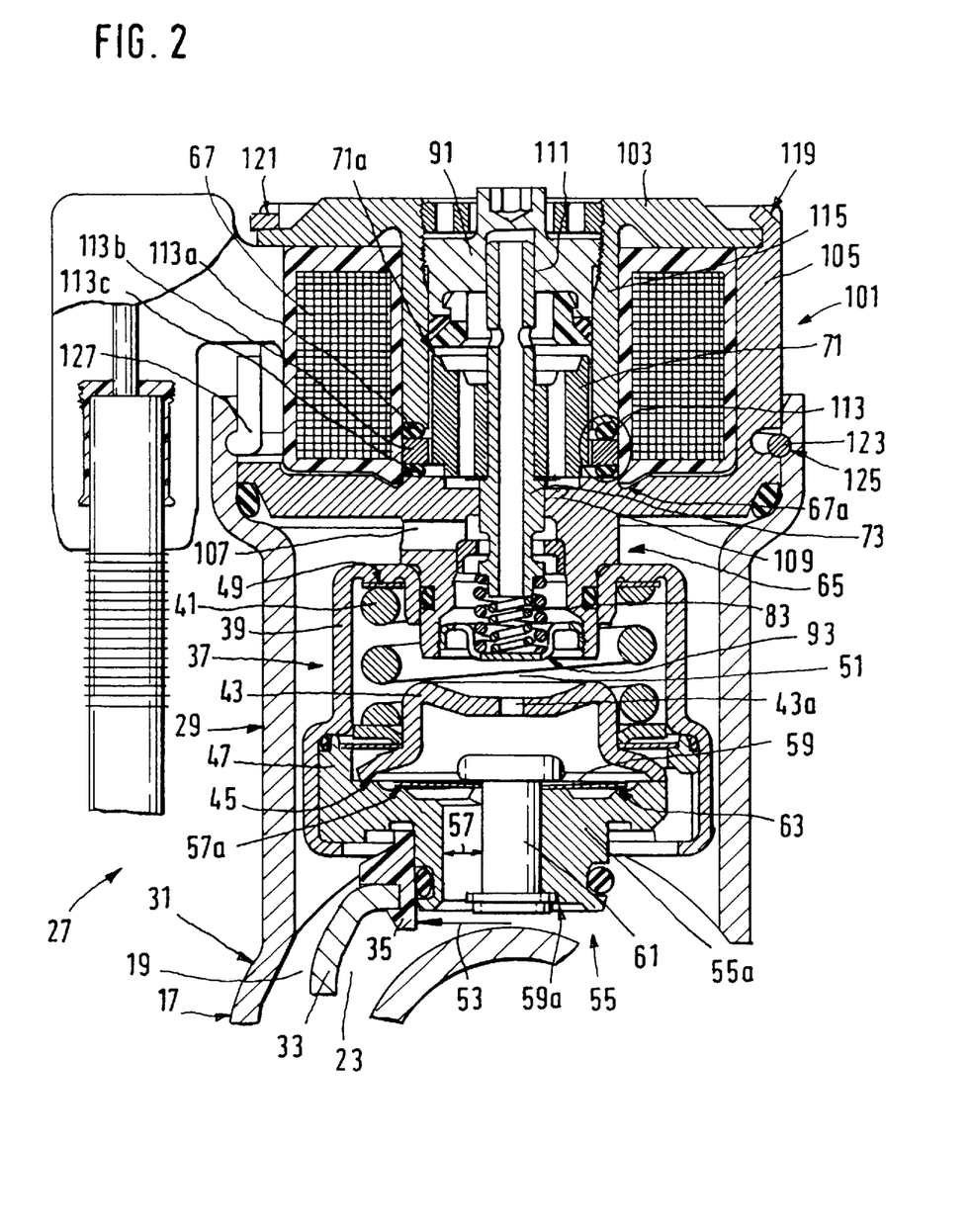
FIG. 2 is a section through a shutoff valve device.

FIG. 2 is restricted to an illustration of the shutoff valve device 27. The shutoff valve device 27 can be connected by a pipe socket 29 to a connecting pipe 31 of the reservoir tube 17. The high pressure segment 23 can be formed by the intermediate tube 5. The intermediate tube 5 can have a connecting opening 33 to the shutoff valve device 27. The connecting opening 33 of the intermediate tube 5 can have a cinched intermediate ring 35. The cinched intermediate ring 35 can form an attachment to a main stage valve 37.

The main stage valve 37 can have, inside a main stage valve housing 39, a spring 41. The spring 41 can apply a bias to a shutoff valve body 43 against a shutoff valve seat 45. The shutoff valve seat 45 can be a component of a disc body 47. The disc body 47 can define the end of the main stage valve housing 39. The spring 41 can be supported on a rear wall 49 of the main stage valve housing 39, whereby the rear wall 49, the main stage valve housing 39 and the disc body 47 together may form a control chamber 51. The design of the pressurized surfaces on the main stage valve 37 preferably follows the principle that the valve-opening surfaces must be larger than the valve-closing surfaces. Consequently, when the incoming flow to the main stage valve 37 is routed via a central channel 53 inside the intermediate tube 5, a downward movement of the shutoff valve body 43 must preferably always be executed when the spring force of the spring 41 is overcome. The main stage valve housing 39 can represent an independent assembly unit which can be subjected to separate inspection and testing.

In another possible embodiment of the present invention, the pressure of damping fluid in the control chamber 51 and the spring force of the spring 41 can be used to hold the ends of the shutoff valve body 43 against the shutoff valve seat 45. However, the ends of the shutoff valve body 43 can be lifted off the shutoff valve seat 45 by a damping fluid overcoming the bias of the spring 41 and the pressure in the control chamber 51. When the ends of the shutoff valve body 43 are lifted off the shutoff valve seat 45, damping fluid can be bypassed into the equalizing chamber 19.

An admission valve 55 can be located inside the central channel 53. The admission valve 55 can include an admission cross section 57, which admission cross section 57 is covered by at least one valve disc 59. In FIG. 2, the plane of the section has been cut through an admission cross section 57 and a web 55a of the admission valve 55. A plurality of admission cross sections 57 can be used which are separated by the webs 55a in the admission valve 55. By means of the admission valve 55 in both the decompression or rebound direction and in the compression direction, a damping force can be produced in a range of velocities of the damping medium in which the main stage valve 37 and/or the pilot valve 65 can be open, so that overall, the damping force characteristic in this velocity range has a tendency to rise to a higher damping force, without any additional efforts or arrangements having to be made on the piston valve 11 and on the bottom valve 15, because as described above, the shutoff valve device 27 is active for both directions of movement of the piston rod 3.

Figure 2A:
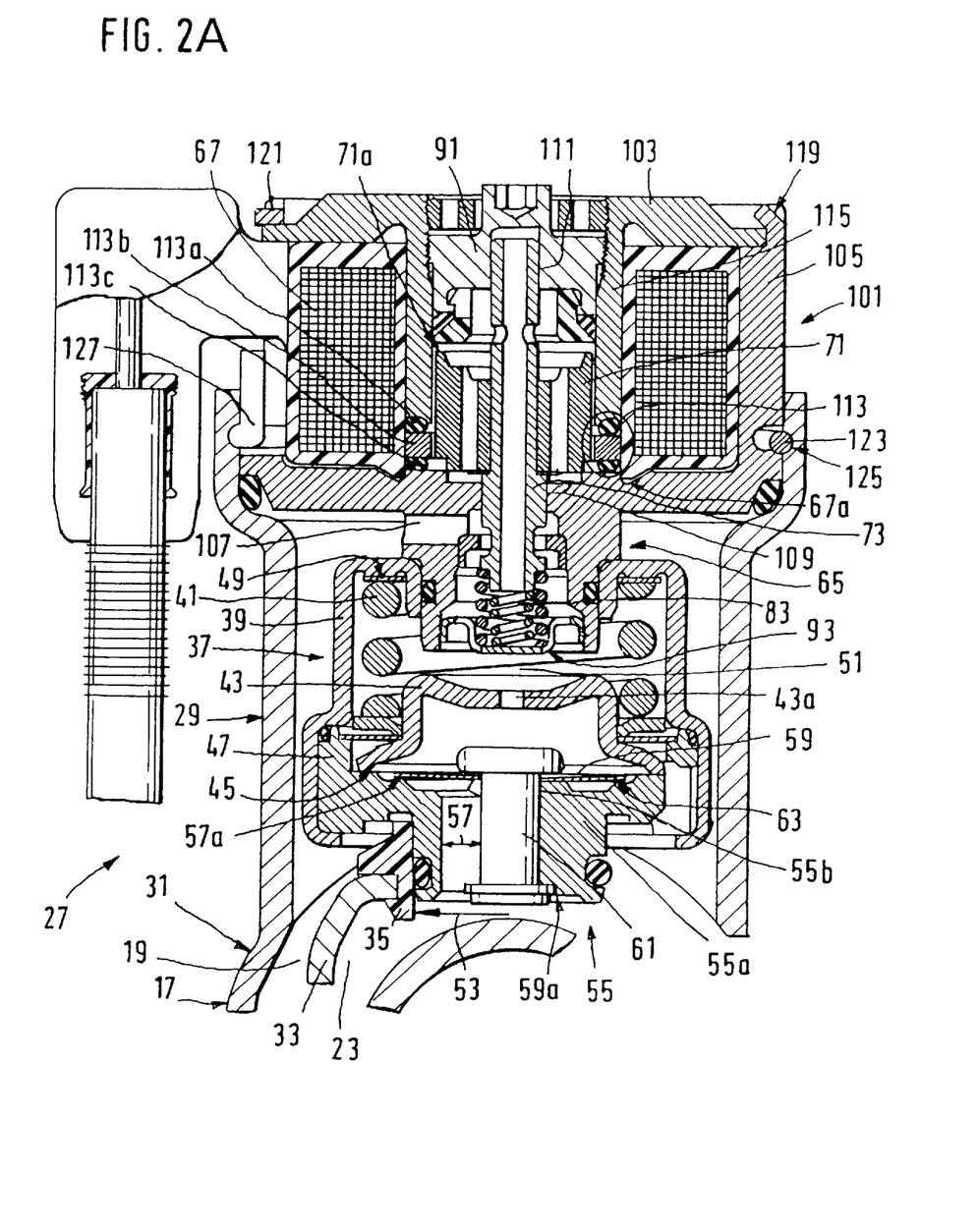
FIG. 2A shows additional features of the shutoff valve device of FIG. 2.

The at least one valve disc 59 can be held on the admission valve 55 by a rivet 61. The webs 55a form an opening 55b (see FIG. 2A) for this purpose. The webs 55a preferably have no connection in the peripheral direction in the vicinity of the opening 55b. In practical terms, the end surfaces of the webs 55a center the rivet 61. Instead of a rivet 61, a screw can also be used. By changing the deformation or bowing of the at least one valve disc 59, the damping force characteristic of the admission valve 55 can be adapted to meet specific requirements. A pilot opening cross section 57a or a pilot throttle by means of an additional pilot throttle disc 59a can also be realized to create a range in which the damping force characteristic of the admission valve 55 is progressive. For the at least one valve disc 59, a valve seat surface 63, which valve seat surface 63 is independent of the shutoff valve body 43, can be worked into the disc bodies 47.

The main stage valve 37 is controlled by a pilot valve 65. The damping medium preferably flows through an opening 43a of the shutoff valve body 43 toward the pilot valve 65. The opening 43a and the inlet or admission cross section 57 can be separated radially from one another, so that the dynamic or impact pressure of the damping medium flowing out of the main stage valve 37 does not act in full on the pilot valve 65.

In another possible embodiment of the present invention, the opening 43a and the inlet cross section 57 can be positioned to be off-center from one another. The opening 43a and the inlet cross section 57 can also be substantially non-colinear. The misalignment of the opening 43a and the inlet cross section 57 can be used to prevent the full impact of the pressure of the damping medium from acting on the pilot valve 65.

Figure 3:
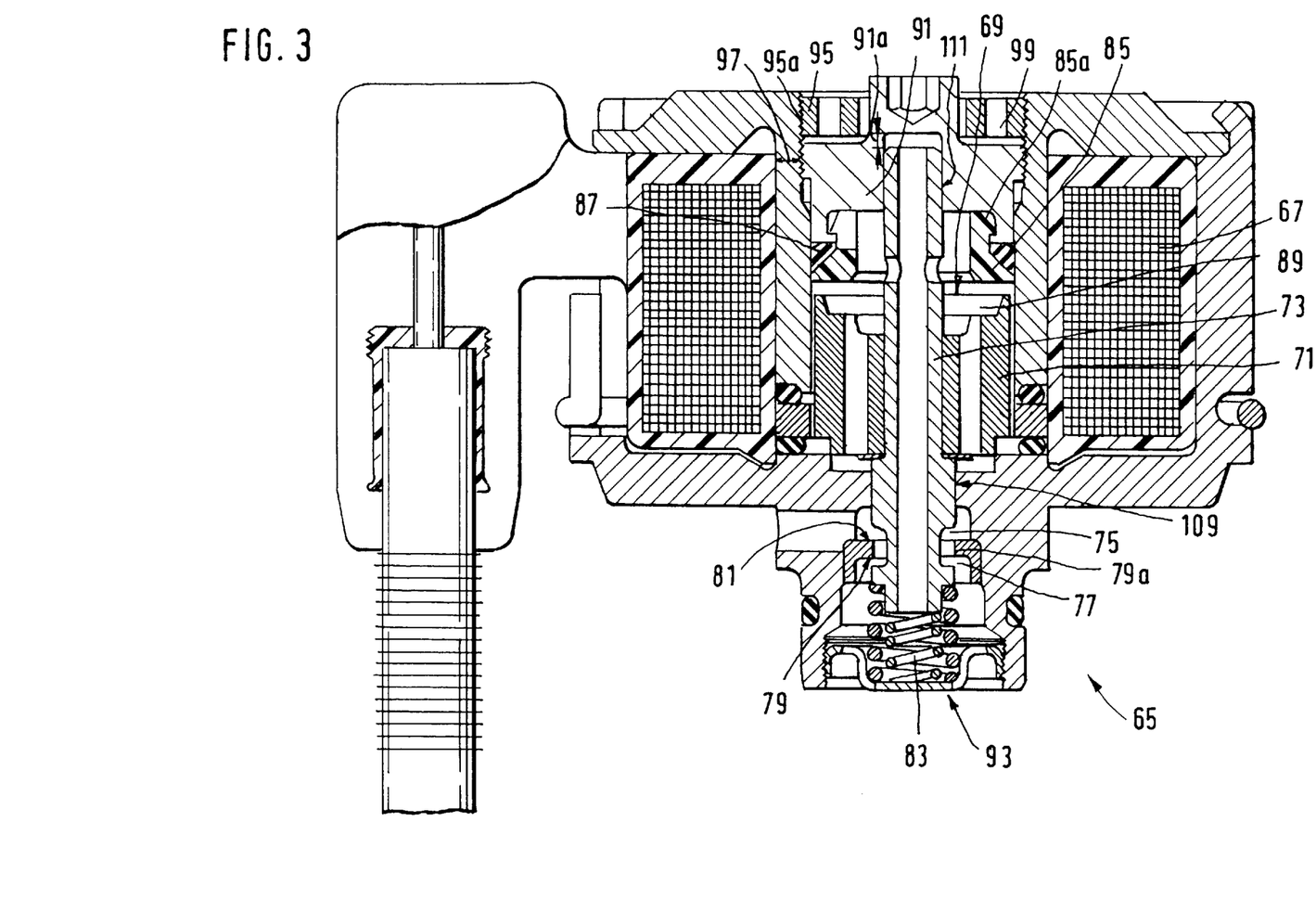
FIG. 3 is a section through the pilot valve of the shutoff valve device.

The pilot valve 65 is shown on an enlarged scale in FIG. 3. The setting of the pilot valve 65 can be modified by an actuator in the form of a magnetic coil or solenoid 67 in connection with an armature 69. The armature 69 can include a magnetically conductive ring-shaped body 71, in which ring-shaped body 71 there is a non-magnetic shaft body 73. The shaft body 73 can be realized in the form of a tube, so that the hydraulic pressure on the armature 69 can be considered to be equalized. The pilot valve 65 can be realized on the end of the shaft body 73 facing the main stage valve 37. The pilot valve 65 can have a valve part 75 for normal operation and a valve part 77 for emergency operation of the shutoff valve device 27. The normal operation valve part 75 can optionally be realized in the form of a seat, gate or sliding valve. The emergency operation valve part 77 can be realized in the form of a gate valve and can interact with a control edge 79. The control edge 79 preferably lies opposite a valve seat 81 for normal valve operation. Consequently, the passage cross section of the normal operation valve part 75 must preferably be increased by the extent to which the passage cross section of the emergency operation valve part 77 decreases.

A minimum passage cross section for emergency operation can be defined by a notch 79a in the control edge 79 or in the emergency operation valve part 77. In this regard, it must be taken into account that above a defined magnitude of the passage cross section for the normal operation valve part 75, there is preferably no longer any change in the pilot action or in the effect of the pilot valve 65. This magnitude can be defined by the stroke length or distance. Consequently, the action of the two valve parts 75, 77 can be set independently by means of the stroke length. A spring set 83 can be used which, in this example, is realized in two parts or pieces. A one-piece spring can also be used, if the spring in question has a non-linear spring rate, i.e. the spring rate increases with increasing spring travel.

In another possible embodiment of the present invention, the stroke length or distance can be approximately equal to the separation distance of the normal operation valve part 75 and the emergency valve part 77 on the shaft body 73.

In the embodiment of FIG. 3, the above-mentioned non-linear spring rate has preferably been realized by means of two springs, which springs have significantly different individual spring rates. A longer spring with a lower spring rate can always be in contact with the shaft body 73 and can apply a bias to the shaft body 73 against the magnetic force or, in emergency operation, against a stop 85. The shorter spring is preferably active only when the armature 69 is in normal operation. Otherwise, there is no contact between the shaft body 73 and the shorter spring.

The stop 85, by means of its position, preferably defines the passage cross section in emergency operation, since the ring-shaped body 71 can be supported with its reverse side on the stop 85. The stop 85 can include a non-conducting material. The non-conducting material preferably has a relative permeability of approximately 1, so that no losses in the magnetic flux occur, and the armature 69 does not adhere to the stop 85. Behind the stop 85 there is a stop seal 87 which seals an armature reaction chamber 89 from the environment. The stop 85 is also preferably made of an elastic material.

Behind the stop 85 there is a set screw 91. The set screw 91 can be adjusted axially with respect to the ring-shaped body 71 by means of a thread together with the stop 85. When the shutoff valve device 27 has been completely installed, the passage cross section can be continuously adjusted for emergency operation by means of this set screw 91, without thereby significantly affecting the normal operation valve part 75, because the valve parts 75, 77 are separated by means of the stroke in connection with the special or individual springs of the spring set 83. There is an axial distance 91a between the set screw 91 and the end of the armature 69 closer to the set screw 91. A connection between the set screw 91 and the stop 85, which connection applies a bias to the stop seal 87, can be made by means of snap hooks 85a. Alternatively, a threaded or press-fitted connection can also be used.

To adjust the normal operation valve part 75 there is a spring support plate 93. The axial position of the spring support plate 93 can also be changed by means of a thread. The spring for the emergency operation valve part 77 can also be changed, but as described several times above, such a change has hardly any effect on the valve action of the emergency operation valve part 75 on account of the low spring rate.

As an additional means to set the pilot valve 65 there is a setting or adjustment device, which adjustment device can be realized in the form of a magnetic control, conducting or guide body 95. The magnetic control body 95 can be located in the vicinity of a magnetic constriction or narrow gap 97. The more the magnetic control body 95 can be displaced by means of a thread 95a toward the ring-shaped body 71, the less the magnetic constriction 97 is effective. As a result of this measure, the magnetic flux and its force on the ring-shaped body 71 can be adjusted against the force of the spring set 83 to compensate for tolerances which can influence the effect of the force on the armature 69.

To improve adjustability, the magnetic control body 95 can have tool surfaces 99 into which tool surfaces 99 an adjustment tool can be introduced. The overall shutoff valve device 27 can thereby have three independent adjustment means which can influence the operational response of the pilot valve 65 and thus of the shutoff valve device 27. The overall shutoff valve device 27, as illustrated in FIG. 2, is preferably located inside a housing 101. The housing 101 can have, among other things, a cover 103 and a cup-shaped locator, holder or mounting 105. The housing 101 thereby preferably forms a part of the return body for the magnetic flux, the force of which can be used to set the armature 69. The locator 105 can form a part of the control chamber 51 and a discharge 107 from the control chamber 51 into the equalizing chamber 19. The locator 105 can also represent the threaded connection for the spring support plate 93 and a first bearing 109 for the shaft body 73. A second bearing 111 can include the set screw 91, which set screw 91 is screwed into the cover 103. The two bearings 109, 111 can be located far apart from one another in relation to the overall size of the pilot valve 65, so that the centering function of the two bearings 109, 111 can be considered to be extraordinarily effective. The ring-shaped body 71 of the armature 69 can be approximately in the center of the shaft body 73. Unavoidable transverse forces can act uniformly on both bearings 109, 111. Additionally, the diameters of the bearings 109, 111 can be realized as rather small, so that the friction forces remain on a particularly low level.

The forces of the magnetic flux can be oriented so that they push the armature 69 downward, toward the main stage valve 37, against the spring set 83. On the locator 105, an optimized transition can be realized on the end of the ring-shaped body 71 facing the first bearing 109. So that the effect of the magnetic flux is applied exclusively to the armature 69 and to prevent a magnetic short circuit, an insulator 113 can be located immediately on the locator 105 in the vicinity of the first bearing 109. The insulator 113 can be made of a non-conducting material and thus, can prevent an overflow or transmission of the magnetic flux from the locator 105 to a sleeve segment 115 of the cover 103. Between the sleeve segment 115 and the ring-shaped body 71 of the armature 69 there is a rather large gap 71*a*, which large gap 71*a* can significantly or clearly restrict the guidance to the two bearings 109, 111. There is no contact between the armature 69 and the sleeve segment 115. For an effective transmission of the magnetic flux, there can be a relatively large peripheral surface available on the ring-shaped body 71. The insulator 113 can include, among other things, a first seal or gasket 113*c*. The first seal 113*c* can be oriented toward or with respect to the locator 105. The first seal 113*c* can be adjacent to the actual insulator 113*b*. The actual insulator 113*b* can have a second seal 113*a* oriented against or with respect to the sleeve segment 115. Two seals or gaskets 113*a*, 113*c* are preferably used, because when a single seal is used, it is possible, on account of the bias applied and the related deformation of the seal, that contact with the ring-shaped body 71 of the armature 69 will occur. The actual insulator 113*b* can have a smaller inside diameter than the ring-shaped body 71. Therefore, contact between one of the seals and the ring-shaped body 71 can be prevented.

In another possible embodiment of the present invention, two seals 113*a*, 113*c* can be used to surround the actual insulator 113*b*. The combined use of the two seals 113*a*, 113*c* can preferably prevent one of the seals from coming into contact with the ring-shaped body 71. When a single seal is used, that seal may be deformed and may come into contact with the ring-shaped body 71. To further prevent the two seals 113*a*, 113*c* from coming into contact with the ring-shaped body 71, the actual insulator 113*b* can be designed to have an inside diameter smaller than the inside diameter of the two seals 113*a*, 113*c*. The actual insulator 113*b* may also have an inside diameter smaller than the inside diameter of the sleeve segment 115. Finally, the actual insulator 113*b* can have an inside diameter larger than the outside diameter of the ring-shaped body 71.

The magnetic coil or solenoid 67 has also preferably been adapted to the insulator 113. For example, the magnetic coil 67 can have a lug-shaped extension 67*a*. The lug-shaped extension 67*a* can guarantee that in no case can the seal 113*c* be displaced into a hypothetical space between the magnetic coil 67 and the locator 105, because the contact surfaces are offset from one another. Changes in the length of the coil 67 or changes inside the clamping system including the sleeve segment 115 and the insulator 113 as a result of thermal expansion can be compensated for without the formation of a gap.

The overall housing 101 of the shutoff valve device 27 can be held together by a crimp 119 or by a circlip 121. This module can be supported on a shoulder of the pipe socket 29. To axially fix the housing 101 in position there is an additional circlip 123, which circlip 123 can be engaged in a locking groove 125 of the pipe socket 29 and can thereby form a snap connection. In the embodiment of the circlip illustrated on the right in FIG. 2, the circlip cannot be removed. The variant of the circlip illustrated on the left in FIG. 2, can have an actuator tongue 127. The end of the actuator tongue 127 can be introduced into a recess in the housing 101, to prevent any accidental opening of the shutoff valve device 27.

In another possible embodiment of the present invention, the circlip 121 and the circlip 123 can both be realized as retaining rings or similar structures. Further, the end of the actuator tongue 127 can be used to remove the circlip or retaining ring from the locking groove 125 without using any assembly tools.

It should be noted that the diameter of the magnetic control body, conducting body or guide body 95 and of the set screw 91 can be slightly larger than the outside diameter of the ring-shaped body 71. It should also be noted that the diameter of the actual valve portion of the pilot valve 65 is preferably not larger than the diameter of the first bearing 109. The emergency operation valve part 77 can be realized in the form of a gate valve. Therefore, the armature 69 can be removed from the shutoff valve device 27 without having to open and disassemble the entire valve. The ability to adjust the parts of the pilot valve 65 separately may be simplified, among other things, by the fact that the two clamping means which act on the armature 69 each act on different ends. The stop 85 can be adjusted on the end facing the magnetic coil 67 and the spring support plate 93 can be adjusted on the end facing the main stage valve 37. The outer spring cannot fall out of the shutoff valve device 27, because the control edge 79 acts as a stop.

Figure 4:
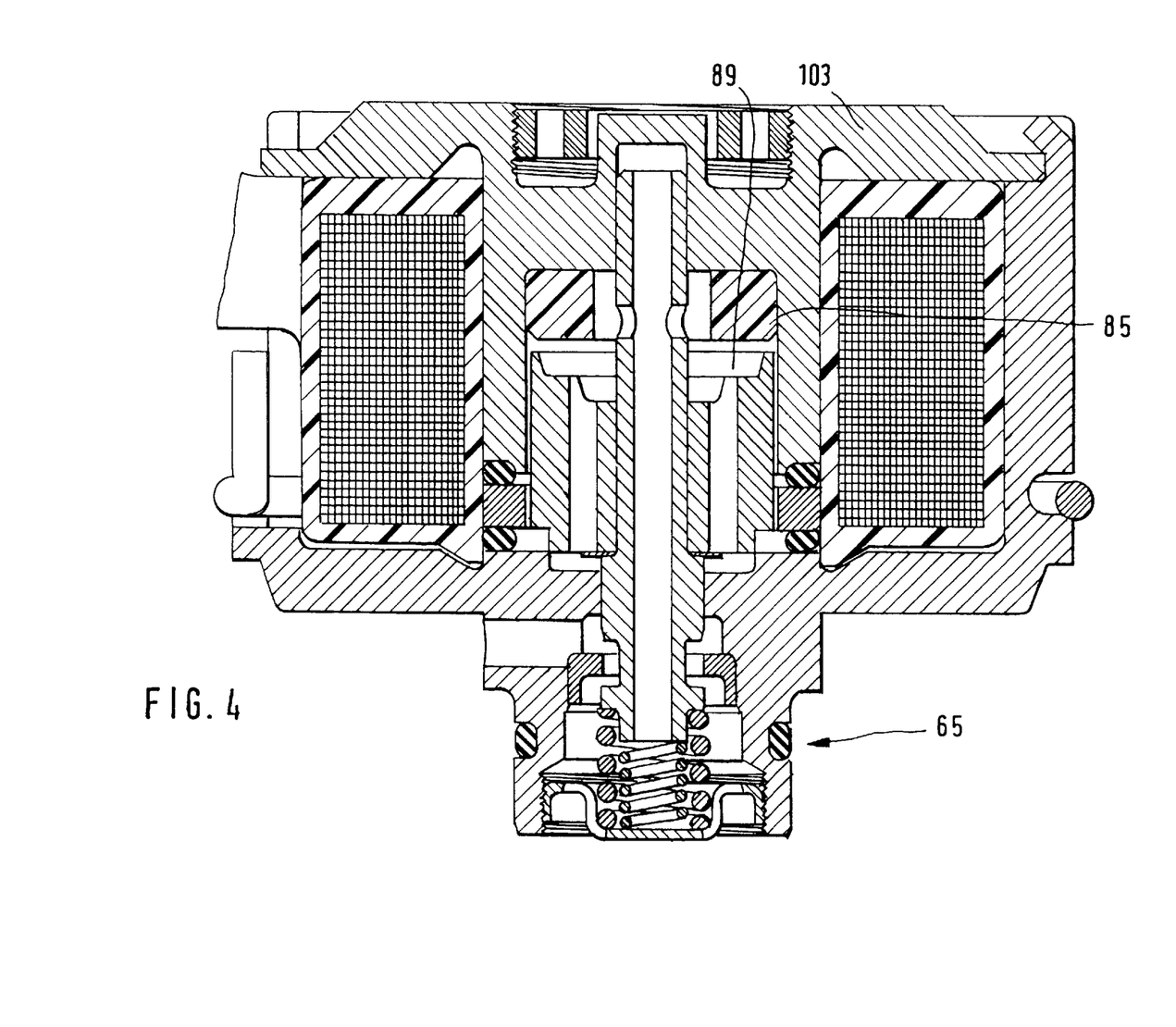
FIG. 4 shows a shutoff valve device with a fixed stop for the emergency operation setting.

FIG. 4 illustrates an embodiment which is simplified in comparison to the embodiment illustrated in FIG. 2. Instead of a set screw 91, there is preferably a fixed stop 85 which fixed stop 85 can be realized in the form of a spacer ring and cannot be adjusted, but can be modified very easily to a defined height for a specific vehicle model. One advantage of the embodiment illustrated in FIG. 4 over the embodiment illustrated in FIG. 2 is that the cover 103 completely closes the armature reaction chamber 89. The cover 103 can also include the area which is otherwise covered by the set screw 91. Consequently, no stop seal or gasket 87 like the one in FIG. 2 is required. The adjustability regarding the normal operation of the pilot valve 65 and of the control body 95 is altogether identical with the function as explained in relation to FIG. 2.

Figure 5:
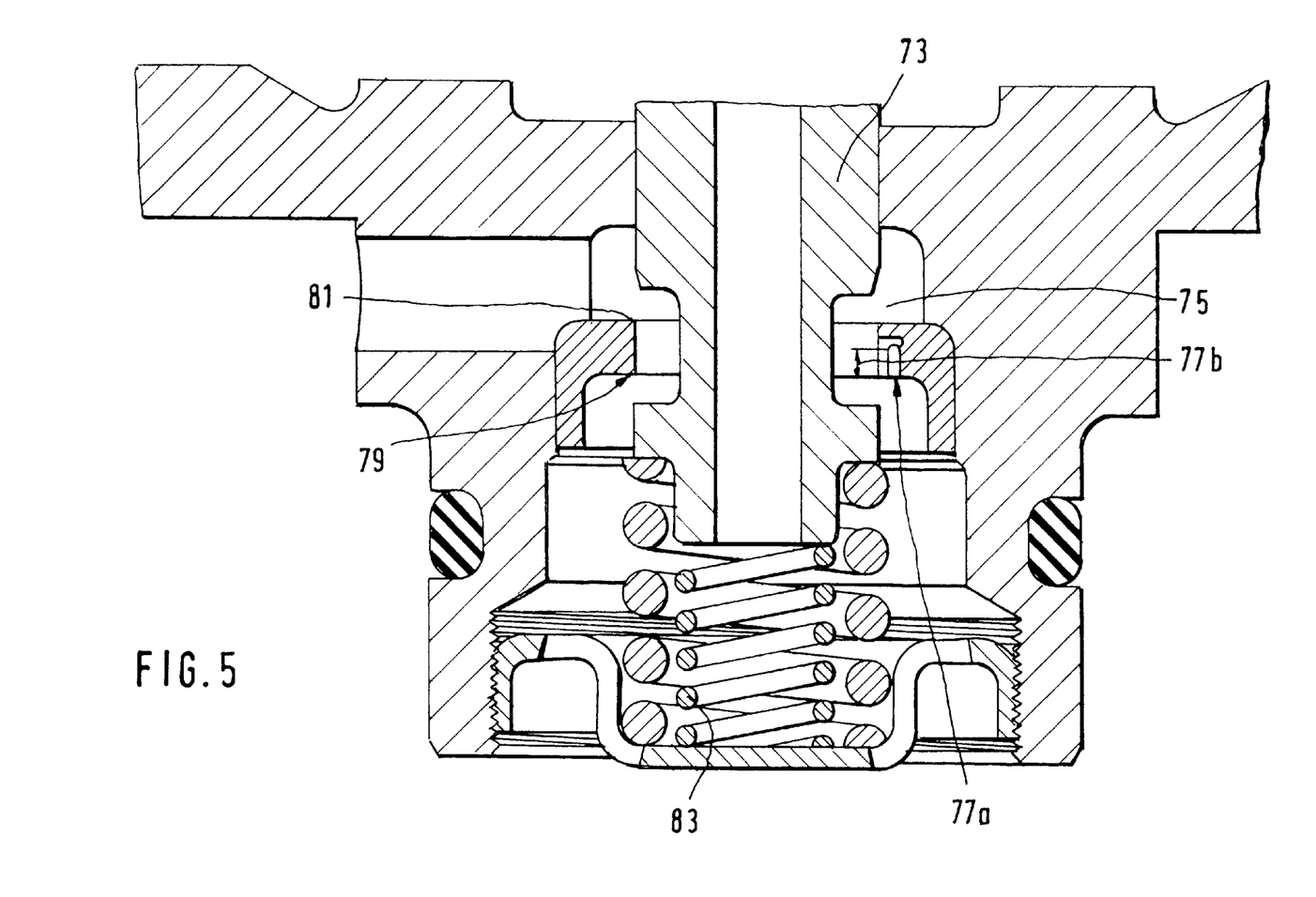
FIG. 5 shows a pilot valve with an emergency operating setting which is independent of the valve travel.

FIG. 5 shows a detail from FIGS. 3 or 4, because the configuration of the cross section for the emergency operating setting is independent of the type of stop for the armature 69. The control edge 79, together with the tubular or shaft body 73 of the armature 69, can represent a shutoff valve which can be realized in the form of a gate valve. As soon as the weaker spring of the spring set 83 has pushed the armature into the emergency operating position, the armature 69 can overlap the control edge 79, so that the flow path is preferably blocked. There may be an emergency operating constant throttle 77*a*, the cross section of which is smaller than the adjacent cross section of the emergency operation constant throttle on the control edge or valve seat 81 of the normal operation valve part 75. The major advantage of this solution for emergency operation is that the unavoidable manufacturing tolerances of the valve parts can be compensated for, because the overlap from the control edge 79 to the outlet of the emergency operating constant throttle is available as the equalization distance 77*b*.

Figure 6:
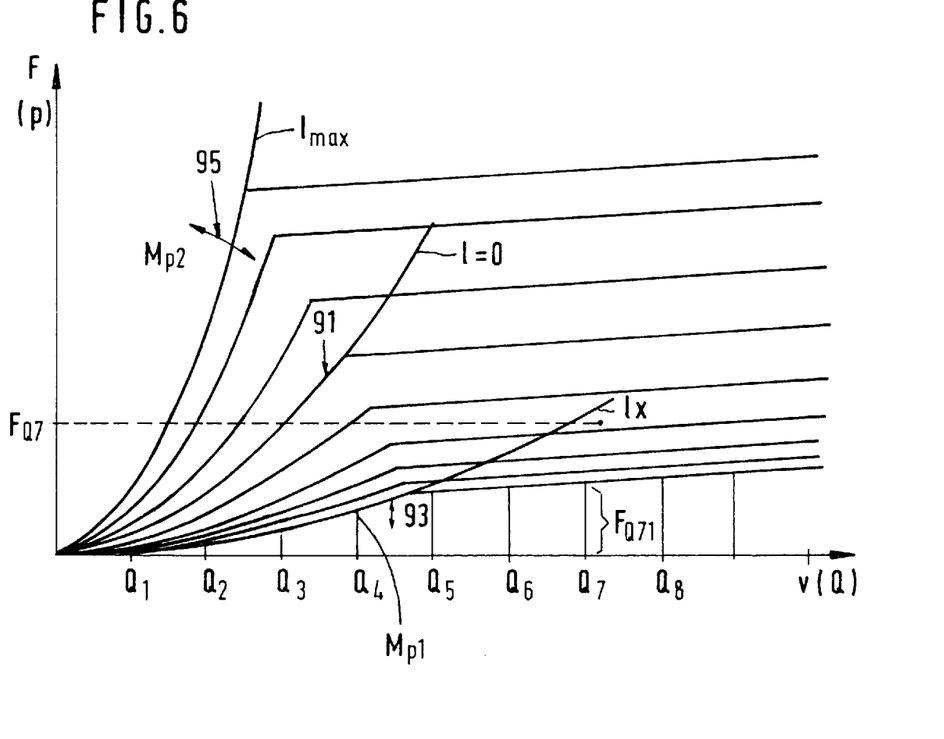
FIG. 6 shows the damping force characteristic of the shutoff valve device.

FIG. 6 illustrates the influence of the settings on the damping force characteristics. The family of damping force characteristics illustrated can be typical for this shutoff valve device. The area from the origin of the characteristic to the salient points may be influenced by the pilot valve 65. During the calibration of the pilot valve 65, first the measurement points Q/p which are significant for the desired setting are specified at a low flow and at a high flow. First, the measurement point $M_{p1}$ is preferably verified. If the measured value is above or below the desired characteristic, the measurement point can be raised or lowered by axially displacing the spring support plate 93 with reference to the specified Q-value, or for a given p-value, it can be displaced parallel to the ordinate. All the pilot characteristics can be influenced in this manner. It can occur that the measurement point $M_{p2}$ exhibits an excessive dynamic effect at $I_{max}$. By loosening the control body 95, the magnetic flux and thus the effect of the force on the armature 69 can be reduced. Thus, a dislocation or separation of the measurement point from the change of direction may be achieved, likewise for the setting of the spring support plate 93. The displacement of the various characteristics may be different as a function of the current or flow values of the individual pilot stage characteristics. In theory, when there is a high flow, the change of the pilot stage characteristic will be more significant than with a characteristic at a lower flow. Consequently, the magnetic control body 95 can be used to achieve a spreading of the overall range of the pilot stage characteristic. This type of adjustment between the magnetic control body 95 and the spring support plate 93 may have to be repeated, because these two settings have an influence on one another.

After the settings for normal operation have been completed, the emergency operating setting can be accomplished by turning the set screw 91. The stop 85 can be displaced by means of the set screw 91 until the desired characteristic is achieved. This characteristic can be set as desired, e.g. a medium characteristic, but it is also possible to set a characteristic which tends toward the hard or soft direction. The designation I=0 within the characteristic should not be any cause for concern, because the characteristic I=0 can naturally also be achieved by the normal operation valve part 75. It should be noted that the characteristic may then be produced by various valve parts within the pilot valve part. The setting I=0 has no influence on the flow-type characteristics.

Figure 7:
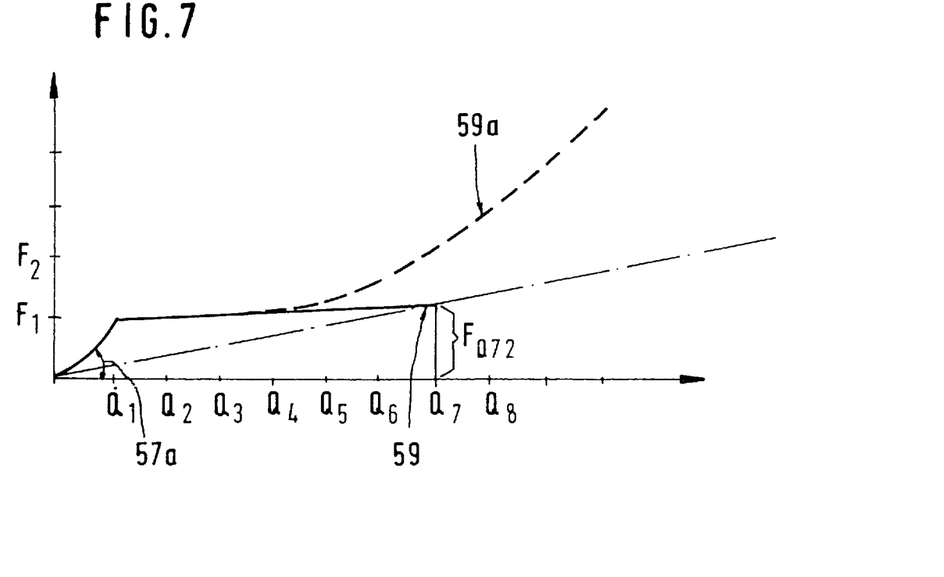
FIG. 7 shows the damping force characteristics of the admission valve.

FIG. 7 shows damping force characteristics of the admission valve 55 which characteristics can be realized independently of the main stage valve 37. A very variable damping characteristic can be achieved by means of an appropriate configuration. For example, the influence of the pilot cross section 57a is clearly pronounced, whereby the slope can be kept flatter by a correspondingly larger opening. The portion of the characteristic represented by the pilot cross section 57a may be followed by a rather degressive branch of the characteristic. This part of the characteristic can be dependent solely on the type of bias of the valve discs 59, and on the characteristic of the valve disc 59, if the valve disc 59 is designed in the form of a spring plate. If necessary, of course, it is also possible to achieve a linear characteristic if the pilot stage cross section 57a is omitted and the valve disc 59 is practically flat. The characteristic indicated by the broken line illustrates the influence of the pre-throttle or pilot throttle disc 59a, which results in a greater increase of the damping force at higher flow velocities.

The admission valve 55 and the main stage valve 37 are preferably hydraulically connected in series. Consequently, it can be possible to simulate or modulate the main stage valve very accurately. The effect achieved by the series connection may be easy to predict, by preparing a desired characteristic field of the shutoff valve device 27 and entering the characteristic field of the main stage valve 37 and of the pilot valve 65 in this characteristic field. The differences in damping force must preferably be produced by the admission valve 55. By way of example, the reverse path is illustrated in FIGS. 5 and 6 at a point with the volume flow $Q_7$. The volume flow $Q_7$ in FIG. 6 can result in the damping force amount $F_{Q71}$. With the same volume flow, and with the admission valve 55, we can get the damping force amount $F_{Q72}$. The simple addition of the two individual damping force amounts then can give the joint damping force amount $F_{Q7}$ as illustrated in FIG. 6. The use of the admission valve 55 can be particularly beneficial if the characteristic damping force curves of the pilot valve 65 and of the main stage valve 37 do not meet the requirements, i.e. if, as a rule, a specified damping force value is not reached. For example, there can be a requirement for relatively flat main stage characteristics, but, particularly at large flow volumes $Q_X$ a larger damping force must be produced, e.g. to prevent wheel shudder or shimmy. Frequently, a somewhat greater damping force may be desired in the characteristic range of the pilot valve 65. In this case, the damping force characteristic illustrated in FIG. 7 can be very effectively used, because it results in an increase in the damping force precisely at low volume flows, but otherwise increases or raises the characteristic uniformly.

It must be borne in mind that the admission valve 55 may make it possible to achieve a harder damping force characteristic without a greater flow or current to the magnet coil 67. The steeper the characteristic of the pilot valve 65 must be, the greater the flow must be to the magnet coil 67, because the greater flow to the magnet coil 67 results in a closing movement of the pilot valve 65.

One feature of the invention resides broadly in the vibration damper comprising a cylinder filled with damping medium in which a piston rod with a piston is realized so that the piston rod can move axially, whereby the piston divides the cylinder into two working chambers, with a damping valve which operates as a function of pressure, and the damping force of the damping valve can be modified by means of an actuator against a spring force on a shutoff valve body, characterized by the fact that an admission valve 55 with its own damping action is connected hydraulically in series with the damping valve 37, so that the action of the admission valve is superimposed on the action of the adjustable damping valve.

Another feature of the invention resides broadly in the vibration damper characterized by the fact that the adjustable damping valve 37 has a pilot cross section 75, 77, on which is superimposed a pilot cross section 57a of the admission valve 55.

Yet another feature of the invention resides broadly in the vibration damper characterized by the fact that the adjustable damping valve 37 is actuated by a pilot stage valve 65, as a result of the fact that the damping valve is in communication via an opening 43a with a control chamber 51, whereby by means of the pressure in the control chamber, a closing force is exerted on the shutoff valve body 43, and the pressure in the control chamber is a function of the size of a throttle cross section 75, 77, the size of which can be adjusted by means of an actuator 67, 69, whereby the throttle cross section of the pilot valve for the damping valve influences the pilot cross section.

Still another feature of the invention resides broadly in the vibration damper characterized by the fact that the admission valve 55 has an admission cross section 57 which is at least partly covered by at least one valve disc 59.

A further feature of the invention resides broadly in the vibration damper characterized by the fact that the opening 43a to the control chamber 51 of the damping valve 37 is realized at some radial distance from the admission cross section 57 of the admission valve 55.

Another feature of the invention resides broadly in the vibration damper characterized by the fact that the valve disc 59 of the admission valve 55 is concentric to the adjustable damping valve 37, whereby each valve has a separate valve seat surface.

Yet another feature of the invention resides broadly in the vibration damper characterized by the fact that the admission valve 55 is provided with a pre-throttle or pilot throttle 59a.

Still another feature of the invention resides broadly in the vibration damper characterized by the fact that the admission valve has a plurality of admission cross sections which are separated by webs.

A further feature of the invention resides broadly in the vibration damper characterized by the fact that the webs toward the center of the admission valve form an opening in which there are fastening means 61 for the at least one valve disc 59.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a motor vehicle, said vibration damper comprising:

a cylinder;

said cylinder being configured to contain a hydraulic damping fluid;

said cylinder comprising a first end and a second end;

said first end of said cylinder being configured and disposed to operatively connect to a first part of a motor vehicle;

said second end of said cylinder being disposed opposite said first end of said cylinder;

a piston rod;

said piston rod sealingly projecting into said second end of said cylinder;

said piston rod comprising a first end and a second end;

said first end of said piston rod being configured and disposed to operatively connect to a second part of a motor vehicle;

said second end of said piston rod being disposed opposite said first end of said piston rod;

a piston;

said piston being disposed on said second end of said piston rod;

said piston being configured and disposed to slide within said cylinder;

said piston being configured and disposed to divide said cylinder into a first chamber and a second chamber;

a first valve apparatus;

said first valve apparatus being configured and disposed to control flow of hydraulic damping fluid from at least one of said first chamber and said second chamber in said cylinder;

said first valve apparatus comprising a valve;

said valve being configured and disposed to change flow characteristics between a plurality of different damping force characteristics over a range of flow of hydraulic damping fluid through said first valve apparatus during operation of a motor vehicle travelling along a road;

a second valve apparatus;

said second valve apparatus being configured and disposed to control flow of hydraulic damping fluid from said at least one of said first chamber and said second chamber in said cylinder;

said second valve apparatus having a flow characteristic;

said second valve apparatus being connected hydraulically to said first valve apparatus to permit at least a portion of flow of hydraulic damping fluid from one of said first valve apparatus and said second valve apparatus to flow through the other of said first valve apparatus and said second valve apparatus;

said flow characteristics of said valve of said first valve apparatus and said flow characteristic of said second valve apparatus resulting in a cumulative flow characteristic of the combination of said flow characteristics of said valve of said first valve apparatus and said flow characteristic of said second valve apparatus;

said first valve apparatus comprising an actuator;

said second valve apparatus comprising at least one channel;

said at least one channel comprising an end;

said at least one channel being configured to permit flow of hydraulic damping fluid through said second valve apparatus;

said second valve apparatus comprising at least one valve disc; and said at least one valve disc being disposed to cover at least a portion of said end of said at least one channel.

2. The vibration damper according to claim 1, wherein:

said first valve apparatus comprises a first passageway;

said first passageway is configured and disposed to control flow of hydraulic damping fluid through said first valve apparatus;

said second valve apparatus comprises a second passageway;

said second passageway being configured and disposed to control flow of hydraulic damping fluid through said second valve apparatus; and one of said first passageway and said second passageway is configured and disposed to control flow of hydraulic damping fluid to the other of said first passageway and said second passageway.

3. The vibration damper according to claim 2, wherein said end of said at least one channel is disposed adjacent to said second passageway.

4. The vibration damper according to claim 3, wherein:

said second valve apparatus comprises a throttle member;

said throttle member is disposed opposite said at least one valve disc; and said throttle member is configured and disposed to throttle flow of hydraulic fluid into said at least one channel.

5. The vibration damper according to claim 4, wherein:

said valve of said first valve apparatus comprises a third chamber;

said third chamber is configured to contain hydraulic damping fluid;

said valve of said first valve apparatus comprises a valve body;

said valve body is disposed adjacent to said second valve apparatus;

said valve body is configured and disposed to form at least a portion of said third chamber;

said valve body comprises a first opening; and said first opening is configured and disposed to permit flow of hydraulic damping fluid into said third chamber.

6. The vibration damper according to claim 5, wherein:

said vibration damper comprises a disc body;

said disc body is disposed between said first valve apparatus and said second valve apparatus;

said disc body comprises a first surface;

said first surface of said disc body is configured and disposed to contact said valve body;

said disc body comprises a second surface;

said second surface of said disc body is configured and disposed to contact said at least one valve disc;

said first surface of said disc body is separate and distinct from said second surface of said disc body;

said valve of said first valve apparatus comprises a spring;

said spring is disposed within said third chamber; and said spring is configured and disposed to apply a bias to said valve body to place said valve body into contact with said first surface of said disc body.

7. The vibration damper according to claim 6, wherein:

said hydraulic damping fluid contained in said third chamber has a pressure; and said pressure of said hydraulic damping fluid contained in said third chamber presses said valve body into contact with said first surface of said disc body.

8. The vibration damper according to claim 7, wherein:

said first passageway has a cross section; and said pressure of said hydraulic damping fluid contained in said third chamber is controlled by flow of hydraulic damping fluid through said cross section of said first passageway.

9. The vibration damper according to claim 8, wherein:

said first valve apparatus comprises a pilot valve;

said pilot valve is disposed adjacent to said valve of said first valve apparatus;

said pilot valve is configured and disposed to adjust said cross section of said first passageway; and said pilot valve is configured to control said valve of said first valve apparatus by adjusting said cross section of said first passageway to change flow characteristics of said first valve apparatus.

10. The vibration damper according to claim 9, wherein:

said second valve apparatus comprises a fastening member; said fastening member is configured and disposed to hold said at least one valve disc over said at least one channel;

said second valve apparatus forms a second opening; and said fastening member is disposed within said second opening.

11. The vibration damper according to claim 10, wherein:

said first valve apparatus has a longitudinal axis;

said first opening is disposed about said longitudinal axis;

said at least one channel is disposed parallel to said longitudinal axis;

said at least one channel is disposed a substantial radial distance from said first opening; and said at least one valve disc is disposed about said longitudinal axis of said first valve apparatus.

12. The vibration damper according to claim 11, wherein said pilot valve comprises:

said actuator;

said actuator comprises a solenoid;

said solenoid is configured and disposed to adjust said cross section of said first passageway;

a shaft member;

said shaft member is disposed along the longitudinal axis;

an armature;

said armature is configured and disposed to be displaced by said solenoid;

said armature is disposed about said shaft member;

said shaft member comprises a first valve part and a second valve part;

a third valve part;

said third valve part is disposed between said first valve part and said second valve part;

said third valve part comprises a first surface and a second surface;

said first surface of said third valve part is disposed adjacent to said first valve part;

said first surface of said third valve part and said first valve part are configured and disposed to together form a first portion of said first passageway;

said second surface of said third valve part is disposed adjacent to said second valve part; and said second surface of said third valve part and said second valve part are configured and disposed to together form a second portion of said first passageway.

13. The vibration damper according to claim 12, wherein:

said at least one valve disc is configured and disposed to be lifted off said second surface of said disc body by flow of hydraulic damping fluid through said second valve apparatus;

at least a portion of said second passageway is formed by flow of hydraulic damping fluid lifting said at least one disc body off said second surface of said disc body;

said second passageway has a cross section;

said cross section of said second passageway controls at least a portion of the flow characteristic of said second valve apparatus;

said first portion of said first passageway has a cross section;

said second portion of said first passageway has a cross section; and at least one of said cross section of said first portion of said first passageway and said cross section of said second portion of said second passageway controls at least a portion of the flow characteristics of said first valve apparatus.

14. The vibration damper according to claim 13, wherein:

said solenoid is disposed about said longitudinal axis;

said second valve apparatus is connected hydraulically to said first valve apparatus to permit flow of hydraulic damping fluid from said second valve apparatus into said first valve apparatus;

said second opening is disposed about said longitudinal axis;

said pilot valve comprises a stop member;

said stop member is configured and disposed to stop displacement of said armature by said solenoid;

said stop member is displaceable along said longitudinal axis;

said pilot valve comprises an adjusting device to displace said stop member;

said first valve part and said second valve part are integral with said shaft member;

one of said cross section of said first portion of said first passageway and said cross section of said second portion of said first passageway comprises said cross section of said first passageway;

said solenoid is configured and disposed to move said shaft member to adjust said cross section of said first passageway;

said pilot valve comprises a spring arrangement;

said spring arrangement is disposed adjacent to said valve;

said spring arrangement is configured and disposed to contact at least a portion of said shaft body;

said spring arrangement is configured and disposed to apply a bias to said shaft member;

said pilot valve comprises a plate;

said plate is configured and disposed to support said spring arrangement;

said plate is displaceable to change the bias applied by said spring arrangement; and said plate is configured and disposed to form at least a portion of said third chamber.

15. The vibration damper according to claim 14, wherein:

said second end of said cylinder comprises a guiding element;

said guiding element is configured to guide said piston rod into said cylinder;

said first chamber is disposed adjacent to said first end of said cylinder;

said second chamber is disposed adjacent to said second end of said cylinder;

said piston comprises a third valve apparatus;

said third valve apparatus is configured and disposed to permit flow of hydraulic damping fluid between said first chamber and said second chamber;

said vibration damper comprises a fourth chamber;

said fourth chamber is disposed about said cylinder;

said second end of said cylinder comprises a third opening;

said third opening is configured and disposed to permit flow of hydraulic damping medium between said second chamber and said fourth chamber;

said vibration damper comprises a fifth chamber;

said fifth chamber is disposed about said fourth chamber;

said fifth chamber is configured and disposed to receive hydraulic damping fluid from said first valve apparatus;

said first end of said cylinder comprises a base plate;

said base plate comprises a fourth valve apparatus;

said fourth valve apparatus is configured and disposed to permit flow of hydraulic damping fluid between said first chamber and said fifth chamber; and said second valve apparatus is configured and disposed to receive hydraulic damping fluid from said fourth chamber.

16. A method of making a vibration damper by tailoring a substantially standard vibration damper to a particular motor vehicle, said method comprising the steps of:

providing a cylinder;

configuring said cylinder to contain a hydraulic damping fluid;

configuring a first end of said cylinder to operatively connect to a first part of a motor vehicle;

providing a piston rod;

configuring a first end of said piston rod to operatively connect to a second part of a motor vehicle;

providing a piston;

connecting said piston to a second end of said piston rod;

disposing said piston within said cylinder to divide said cylinder into a first chamber and a second chamber;

disposing said first end of said piston rod to extend from a second end of said cylinder;

configuring said piston to slide within said cylinder;

providing hydraulic damping fluid;

disposing said hydraulic damping fluid in said cylinder;

sealing said second end of said cylinder;

providing a given first, electromagnetic, valve with predetermined flow characteristics;

providing an actuator for said first, electromagnetic, valve;

determining flow characteristics of a vibration damper with said first, electromagnetic, valve required for the particular motor vehicle;

selecting from a plurality of different valves, having different flow characteristics, a second valve to have a flow characteristic that when combined with the predetermined flow characteristics of said first, electromagnetic, valve will result in the determined flow characteristics of said vibration damper required for the particular motor vehicle;

connecting hydraulically said second valve to said first, electromagnetic, valve to form a combined damping valve apparatus to generate the determined flow characteristics of said vibration damper upon flow of hydraulic damping fluid through said combined damping valve apparatus;

connecting said combined damping valve apparatus to said cylinder to receive hydraulic damping fluid from said cylinder upon movement of said piston in said cylinder;

configuring said second valve to have at least one channel providing at least one valve disc; and positioning said at least one valve disc to cover at least a portion of said at least one channel of said second valve.

17. The method of making a vibration damper according to claim 16, wherein said method comprises the additional steps of:

providing a throttle member; and attaching said throttle member to said second valve to throttle flow of hydraulic damping fluid into said second valve and to alter the flow characteristic of said second valve.

18. The method of making a vibration damper according to claim 17, wherein said method comprises the additional steps of:

positioning said at least one valve disc to be concentric to said first, electromagnetic, valve;

providing a fastening element;

positioning said fastening element to hold said at least one valve disc in position; and configuring said first, electromagnetic, valve to have an opening disposed a substantial radial distance from said at least one channel of said second valve.

19. The method of making a vibration damper according to claim 18, wherein said method comprises the additional steps of:

providing a disc body;

inserting said disc body between said first, electromagnetic, valve and said second valve;

configuring said disc body to have separate valve seats for said first, electromagnetic, valve and said second valve; and said step of providing a first, electromagnetic, valve comprises the steps of:
providing a control valve;
providing a pilot valve; and
configuring said pilot valve to control the action of said control valve.

20. The method of making a vibration damper according to claim 19, wherein said method comprises the additional steps of:

said step of connecting said combined damping valve apparatus to said cylinder comprises the steps of:

providing a first tube;

disposing said first tube about said cylinder;

configuring said first tube to contain hydraulic damping fluid;

boring a hole in said cylinder to connect said second chamber to said first tube;

connecting said first tube to said second valve to permit flow of hydraulic damping fluid from said second chamber to said second valve;

providing a second tube;

disposing said second tube about said first tube;

configuring said second tube to contain hydraulic damping fluid and a gas pocket; and connecting said second tube to said first, electromagnetic valve to permit flow of hydraulic damping fluid into said second tube from said first, electromagnetic, valve;

providing a piston valve apparatus;

disposing said piston valve apparatus on said piston to hydraulically connect said first chamber and said second chamber;

providing a base plate valve apparatus;

disposing said base plate valve apparatus in said first end of said cylinder to hydraulically connect said first chamber and said second tube;

providing a guiding unit to guide said piston rod into said cylinder; and disposing said guiding unit in said second end of said cylinder to at least partially seal said second end of said cylinder.

\* \* \* \* \*